United States Patent [19]

de Couasnon et al.

[11] 4,168,400

[45] Sep. 18, 1979

[54] DIGITAL COMMUNICATION SYSTEM

[75] Inventors: Tristan de Couasnon; André Marguinaud, both of Chatou, France

[73] Assignee: Compagnie Europeenne de Teletransmission (C.E.T.T.), Chatou, France

[21] Appl. No.: 887,055

[22] Filed: Mar. 16, 1978

[30] Foreign Application Priority Data

Mar. 31, 1977 [FR] France .................. 77 09810

[51] Int. Cl.² .............................................. H04J 6/00
[52] U.S. Cl. ........................... 179/15 BA; 179/15 BW
[58] Field of Search ........ 179/15 BV, 15 BA, 15 AL, 179/15 AF, 15 BW

[56] References Cited

U.S. PATENT DOCUMENTS 3,988,545 10/1976 Kuemmerle .................... 179/15 BV

OTHER PUBLICATIONS

The Bell System Technical Journal, vol. 50, No. 9, Nov. 1971, New York, Hayes et al, "Traffic Analysis of a Ring Switched Data Transmission System", pp. 2947-2978.
Bulletin Scientifique de l'A.I.M., 88ᵉ annee, n° 2-1975, Liege, Morning et al, "Minimet, a PACKET-Switching Minicomputer Network for Real-Time Instrumentation", pp. 153-159.
Proceedings of the Institution of Electrical Engineers, vol. 124, No. 3, Mar. 1977, London, Majithia et al., "Analysis and Simulation of Message-Switched Loop Data Networks", pp. 193-197.

Primary Examiner—David L. Stewart
Attorney, Agent, or Firm—Cushman, Darby & Cushman

[57] ABSTRACT

In a digital communication system in which the information is transmitted by successions of bits termed packets, stations may be called upon to perform the function of a relay between other stations. The stations which may be called upon to perform the function of a relay comprise: a checking device which merely checks the address code of a packet received; an eliminating and switching device which either destroys the packet (doubtful address code) or orients the packet toward receiving means pertaining to the station (address code identical to the code of the station) or toward the station corresponding to the address code by passing through a transit memory; and information producing means for producing packets within the station. The contents of the transit memory are transmitted in priority by the station. The packets produced within a station are transmitted in the gaps between the packets coming from the transit memory and in an order which is a function of a classification between the priorities allocated to the information producing means of the considered station.

4 Claims, 8 Drawing Figures

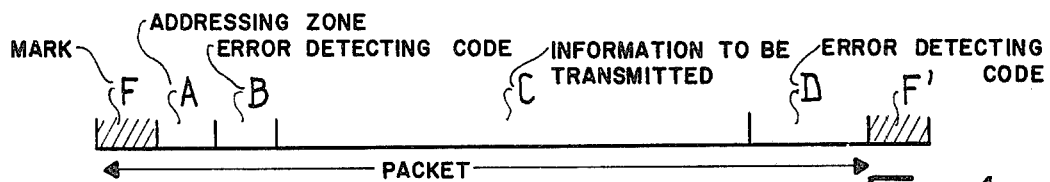
Fig_1
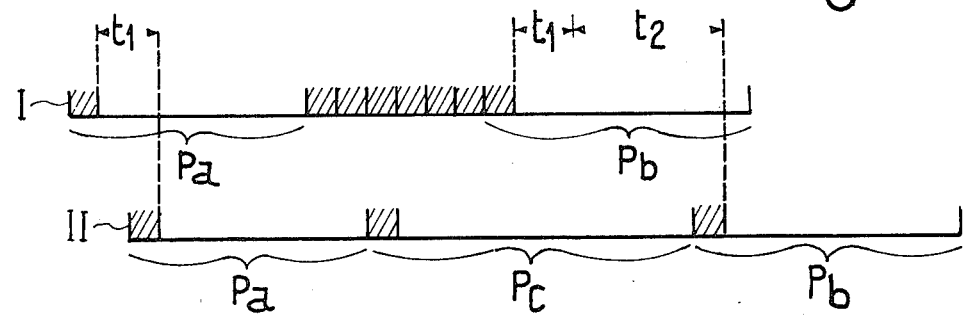
Fig_2
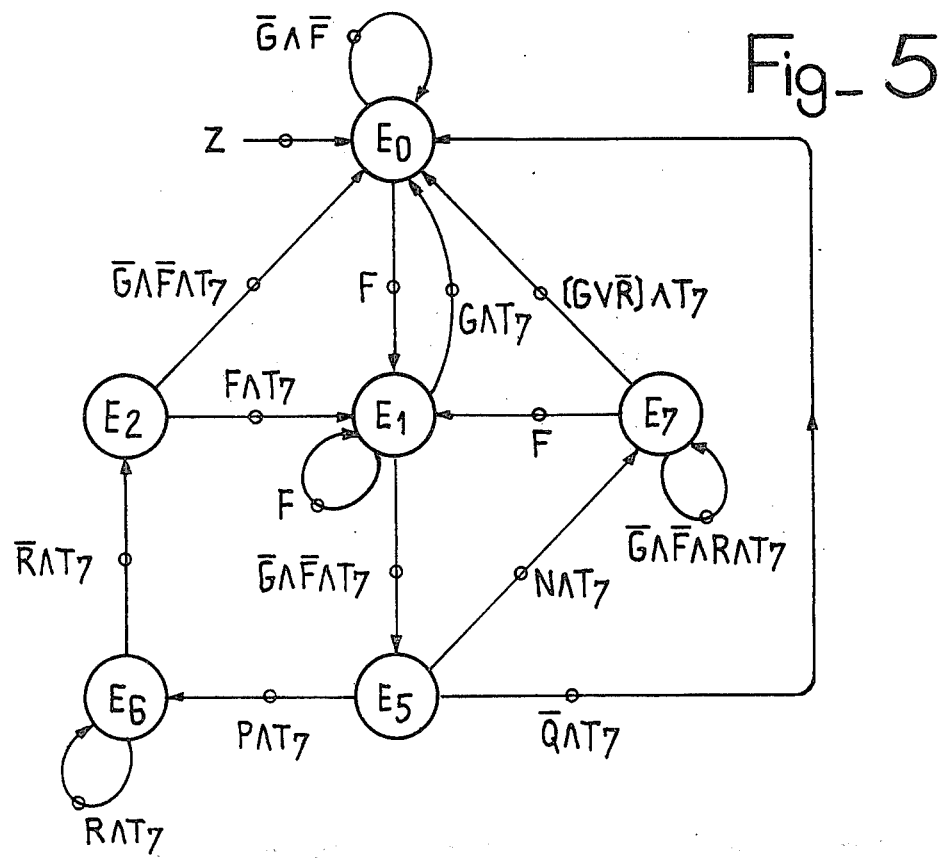
Fig_5

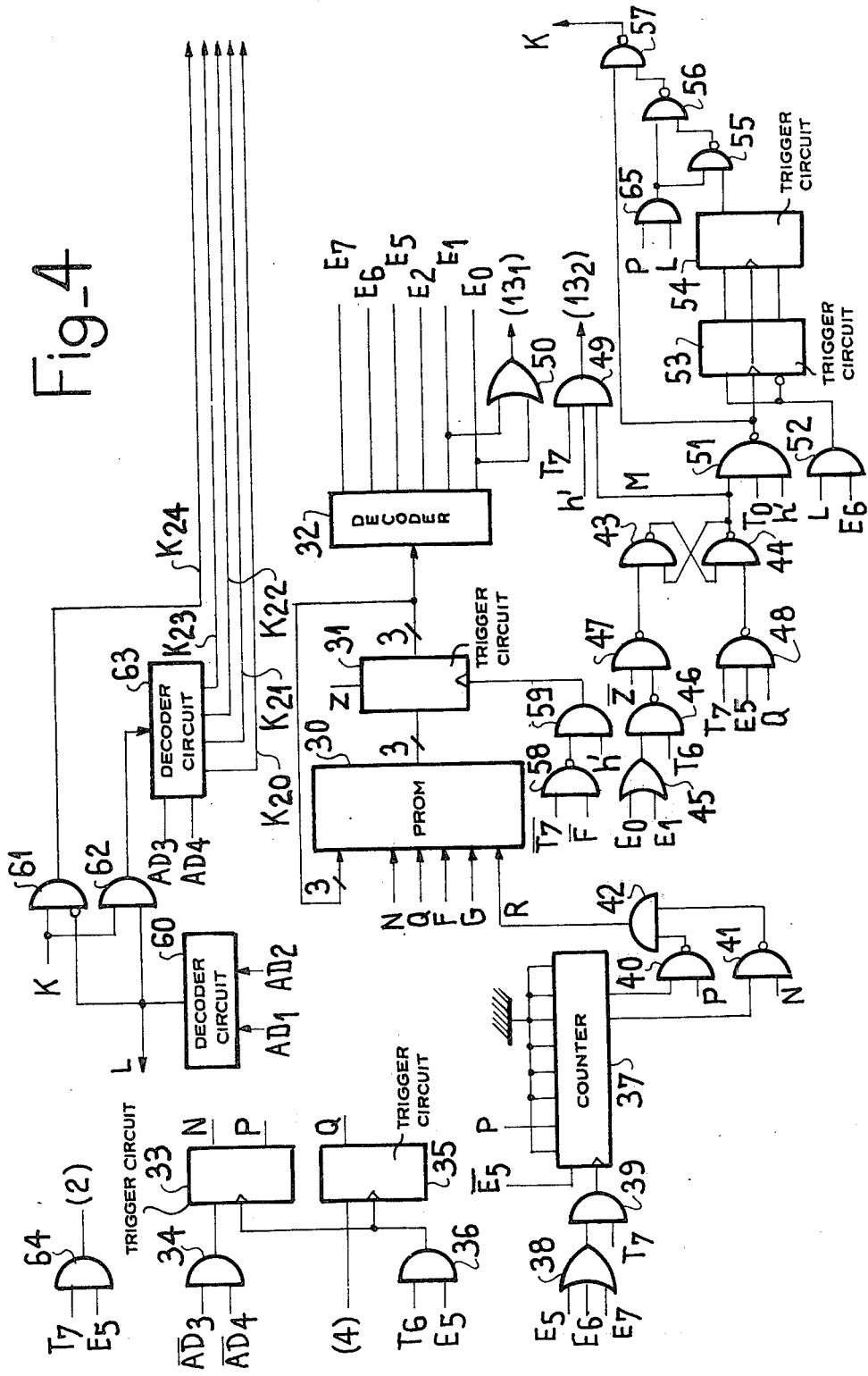

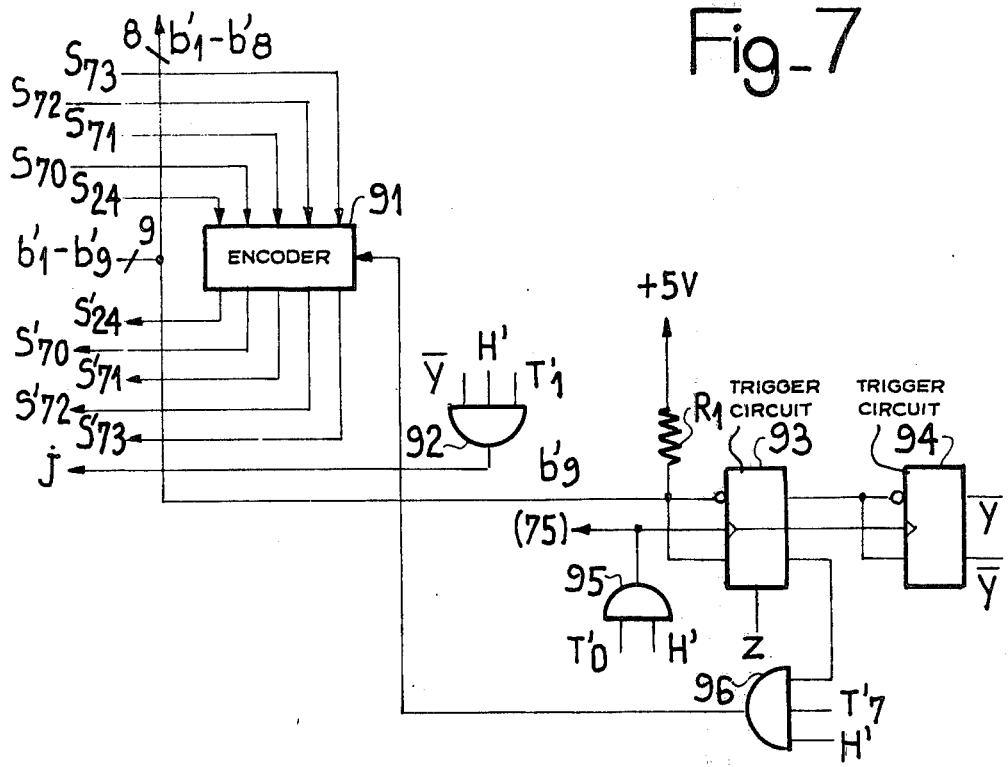
Fig_7
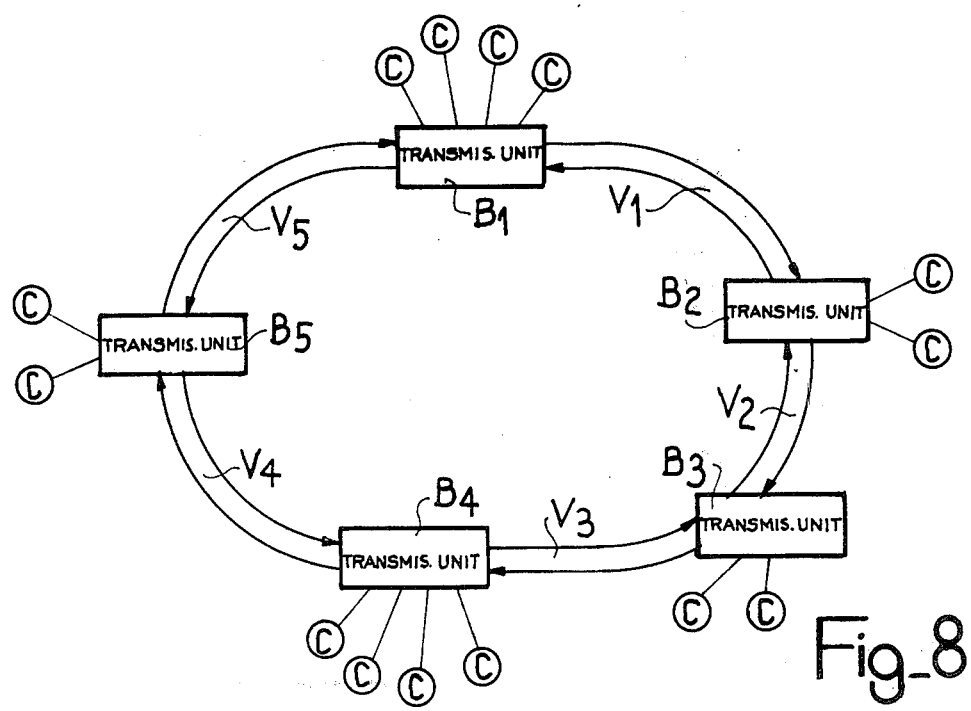
Fig_8

DIGITAL COMMUNICATION SYSTEM

The present invention relates to a digital communication system in which the information is transmitted by successions of bits termed packets and in which all the packets have not the same length. Each packet comprises bits marking the beginning of the packet, address bits indicating for which station of the communication system the packet is intended, error detecting bits and information bits.

Such systems are known in which the packets are exchanged between adjacent stations. Each packet arriving in a station to which it is not addressed but which it must traverse is stored in this station so as to check the validity of its information bits and is retransmitted only if its validity is acknowledged. This storage of the packet results in an overall delay in transmission which depends on the size of the packets and the number of stations traversed. This delay, which is of several tenths of a second in current systems, is incompatible with the characteristics required for the transmission of certain items of information, for example the items of information to be transmitted in a telephone connection.

An object of the present invention is to avoid this drawback by reducing the delay which might affect the transmission of the packets.

According to the invention, there is provided a digital communication system between N stations (N greater than 2) in which the stations comprise information producing means, the information being transmitted in the form of packets of variable length comprising address bits and in which the communications between at least certain of the N stations are established by means of at least one other of the N stations performing the function of a relay, each of the N stations which may be called upon to perform the function of a relay comprising: a checking device for receiving packets produced in the other N stations and checking the sole address bits; an eliminating device coupled to said checking device for eliminating packets the interpretation of the address bits of which is considered to be doubtful by the checking device; and an inserting device coupled to said eliminating device and to said information producing means for receiving packets, for subordinating the transmission of packets produced in said information producing means to the presence of a gap between the packets received from said eliminating device and for transmitting integrally a packet received from said information producing means irrespective of the length of said gap, said inserting device comprising a storing device for storing packets received from said eliminating device.

It must be pointed out that it is also known (THE BELL SYSTEM TECHNICAL JOURNAL—Vol. 50, No. 9, November 1971, pages 2947-2978—"Traffic analysis of a ring switched data transmission system") to transmit the packets elaborated in a station during the gaps between the packets to be retransmitted by this station; however the system which is described works only with packets of fixed length and gaps having a length equal to the length of a packet or to a multiple of this length.

The invention will be better understood from a consideration of the ensuing description and the accompanying drawings in which:

FIG. 1 represents how a packet is made up;

FIG. 2 represents the insertion of a packet between two other packets;

FIG. 4 represents a detailed diagram of a circuit of FIG. 3;

FIG. 5 represents a diagram of the circuits of FIG. 4;

FIG. 7 represents a detailed diagram of a circuit of FIG. 5;

FIG. 8 represents a digital communication system according to the invention.

FIG. 1 shows a configuration of a packet for a system according to the invention. The packet comprises:

Figure 3:
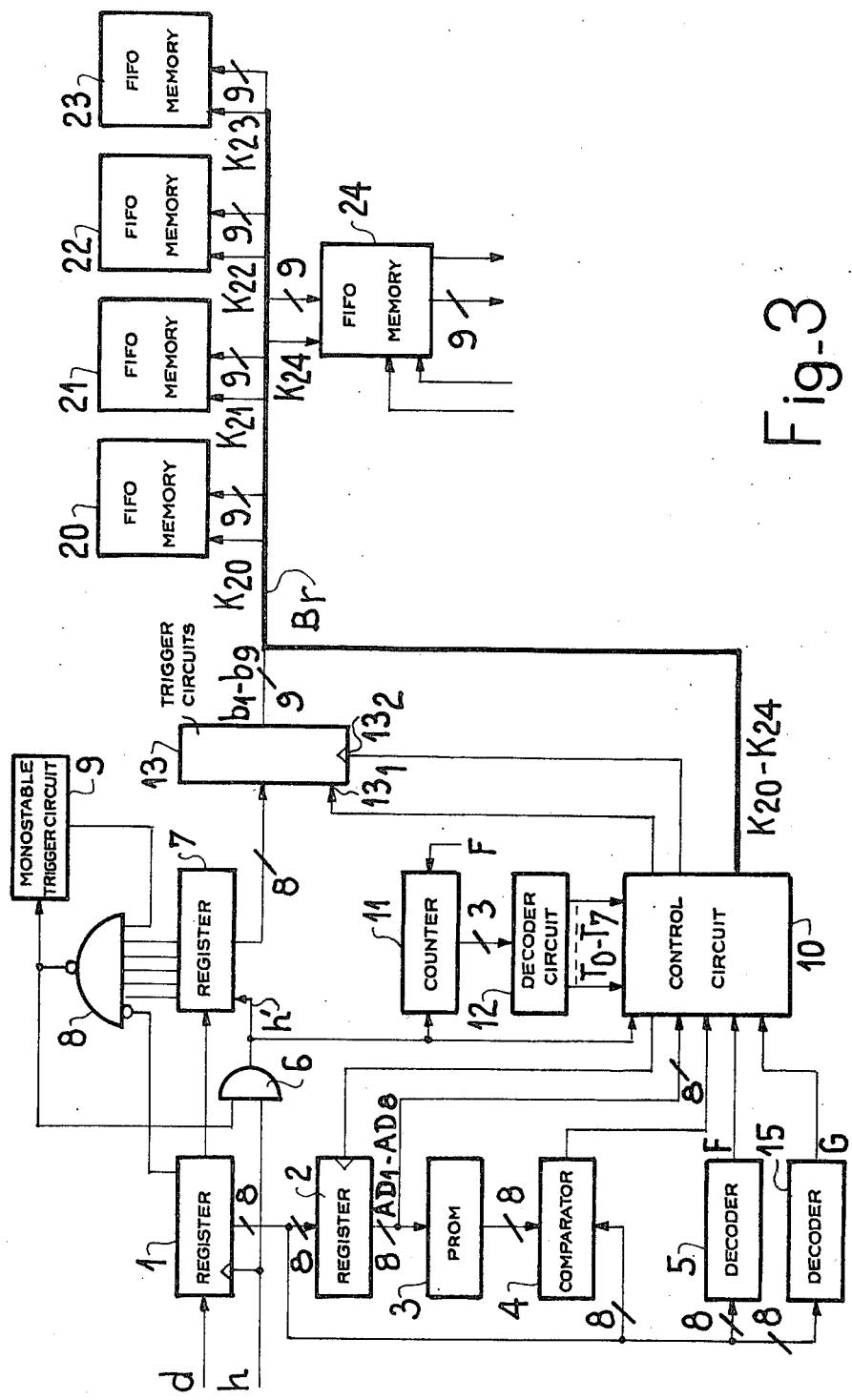
FIG. 3 represents the receiving part of a switching means of a system according to the invention.

a marking zone comprising a mark, F, for marking the beginning of the packet; in the ensuing description, the marks will be formed by six "1" bits which are preceded and followed by an "0" bit, an addressing zone A comprising an address code, a zone B constituting an error detecting code for the addressing zone A, a zone C which contains the information to be transmitted, and a zone D constituting an error detecting code for the zone C or for the zone C and one or both of the zones A and B.

The packet is followed by a mark F' which is identical to the mark F and may be either the mark of the beginning of the following packet or a filler mark, since in the case where two packets are not joined together successive marks are inserted therebetween.

According to the considered type of traffic, the packets may comprise or not comprise the zone C.

Note that in order to avoid confusions, the mark configuration ("01111110") must only be in the zone F. For this purpose, in a packet outside the zone F an "0" bit is systematically added after the "011111" configuration in the sequence of bits such as will be transmitted. This "0" will be systematically eliminated upon reception.

The packets are processed in the manner indicated hereinafter which will be illustrated by the circuits represented in FIGS. 3 to 6.

Each switching means which starts to receive a packet stores the incident bits until the complete reception of the address zone A; thenceforth the switching means knows if the packet is intended for it or not. If the packet is not intended for it, it can immediately retransmit it.

However, as the digital transmission channels between switching means may introduce errors in the address zone A, the zones A and B (error detecting code concerning zone A) are processed thereafter in each switching means and the switching is effected according to the following principle:

if the contents of the zones A and B are coherent, the switching means accepts the packet or retransmits it according as the address contained in its zone A is or is not the address of the switching means, if the contents of the zone A and B are incoherent, the packet is destroyed in order to ensure that it is not addressed to a switching means for which it is not intended or that it does not unnecessarily encumber the system because it has failed to be taken into account by a switching means.

This principle of operation of the switching means greatly reduces the delay in the progress of a packet in passing through a switching means.

Inasmuch as a packet comprises a zone D, the procedure for confirming good reception of a packet will therefore no longer be between adjacent switching means as in existing systems but between the transmitting switching means and the receiving switching means of the same packet.

As the purpose of the system according to the invention is to obtain a packet transmission time which is as short as possible, in each switching means priority is given to the retransmission of packets which are in transit in the switching means over the packets awaiting transmission by this switching means.

By way of example, FIG. 2 shows how under these conditions a packet $P_c$ awaiting transmission in a switching means is inserted in the binary stream II issuing from this switching means. FIG. 2 shows the binary stream I entering the switching means; this binary stream comprises two nonadjacent successive packets $P_a, P_b$ separated by six filler marks. A comparison of the position of the packet $P_a$ in the binary streams I and II shows that the minimum time for passing through a switch has a duration $t_1$; this duration $t_1$ is of the order of magnitude of the ratio of the sum of the lengths of a zone A and zone B (see FIG. 1) expressed as the number of bits, over the transmission line speed in the considered network expressed as the number of bits per second. In the example which will be described hereinafter in which the zones A and B are two groups of eight bits conventionally termed octets, and in the case where the transmission line speed in the network is $2 \times 10^6$ bits/second, the time $t_1$ is about 18 microseconds.

The insertion of the packet $P_c$ in the stream II is only authorized if two packets in transit in this switching means are not consecutive, since, as seen before, a packet in transit has priority over a packet awaiting transmission in the switching means. For this, the two packets in transit must be separated by at least one filler mark, that is to say, in counting the mark of the beginning of a packet, that the input binary stream I comprises at least two successive marks. With this condition satisfied between the packets $P_a$ and $P_b$ of the stream I, the packet $P_c$ may be inserted in the stream II between the packets $P_a$ and $P_b$; the delay $t_2$ in the transmission of a packet, owing to the insertion of another packet, will be less than the duration of the inserted packet. Note that a delay due to the insertion of a packet could practically only occur once in the course of the transmission of a packet; indeed, on one hand, the packet passing through the switching means (for example $P_b$) and the packet transmitted by the switching means (for example $P_c$) are adjacent at the output of the switching means (stream II), which no longer permits the insertion of packets therebetween, and, on the other hand, bearing in mind the speed of transmission of the packets and the very small delays produced by the passage through the switching means, all the switching means of a connection between two switching means practically operates, at a given instant, on the same packet, so that, for example, when the packet $P_c$ is inserted in the stream II, there is no longer any possibility of insertion of a packet in front of the packet $P_a$ which precedes the packet $P_c$.

The embodiment which will be described is intended for both telephonic transmission and data transmission; the latter term here signifying information other than telephonic information. The packets employed in this embodiment will be packets of 32 octets, at the most, not including the mark and the added "0" bits, in the case of data transmission and 64 octets in the case of the telephone. The address code will have the following configuration, which is intended for a system in which there are connected to each switching means two teletypes and three telephones:

| | |
|---|---|
| 1st and 2nd bits : | address of the destination station |
| 3rd and 4th bits : | address, in the destination station, of the concerned telephonic unit, for example |
| | 00 = no telephonic unit concerned |
| | 01 = telephonic unit 1 |
| | 10 = telephonic unit 2 |
| | 11 = telephonic unit 3 |
| 5th and 6th bits : | address in the destination station, of the concerned data unit, for example |
| | 00 = no data unit concerned |
| | 01 = teletype 1 |
| | 10 = teletype 2 |
| | 11 = supervising device of the system. |

FIG. 3 shows and embodiment of the receiving part of a switching means for the processing of packets according to the switching principle explained before.

In this Figure and the following Figures, the clock inputs of the circuits are designated by an arrow head, within the circuit, in extension of the input. Further, when a binary signal is inverted at the input or output of a circuit this input or output is designated by a small circle.

In this Figure, as in the following Figures, a simple connection will be represented by a thin line and a multiple connection either by a thick line or a thin line intersecting a short straight line against which a figure will indicate the number of single connections making up this multiple connection.

A conventional demodulating device (not shown) furnishes the input binary items of information (signal d) and the clock pulses (signal h) relating to the binary items of information d.

The binary items of information d are applied to the signal input of a shifting register 1 which receives the signal h at its shifting control input. The register 1 is a register having eight stages the eight outputs of which are connected to the inputs of a buffer register 2, of a comparator 4 and of two decoders 5 and 15.

The output of the eighth stage of the register 1 is also connected to the input of a shift register 7 having eight stages; the register 7 therefore receives the same signal as the register 1, but with a delay of the duration of eight periods of the signal h. An additional output connected to the eighth stage of the register 1 gives a "1" or "0" level, depending on whether a bit of value "1" or "0" has been entered in this eighth stage. This additional output is connected to the first input of a NAND gate 8 having seven inputs; only the first of these seven inputs is an input with inversion.

The register 7 serves in particular to eliminate the "0" introduced in the items of information to be transmitted when five "1" bits follow each other in a zone other than the marking zone F. For this, the gate 8 detects the configuration "111110" (that is to say the added "0" bits) at the moment when the five "1"s of this configuration are already in the first five stages of the register 7 and the "0" is still in the eighth stage of the register 1; the outputs of the first five stages of the register 7 are for this purpose respectively connected to the second to sixth stages of the gate 8. The control input of the register 7 receives the signal h through an AND gate 6 which is blocked by the passage of the gate 8 to "0" that is to say by the detection of the configuration "111110"; The "0" of this configuration therefore cannot be transferred from the eighth stage of the register 1 to the first stage of the register 7 and the AND gate 6 furnishes a holed clock signal h'. A monostable trigger circuit 9 is employed for ensuring that the gate 8 for detecting the added "0" bits does not continue to block the AND gate 6 when an "0" bit is in the five bits which follow an added "0" bit. For this purpose, it is sufficient that the five bits which follow an added "0" bit be transferred in the first five stages of the register 7. For this, the monostable trigger circuit 9 has its input and output respectively connected to the output and the seventh input of the gate 8 and the duration of its quasi-stable state is chosen to the equal to about six periods of the signal h; this monostable trigger circuit is moreover so chosen that the delay in the establishment of this quasi-stable state is sufficient to ensure that gate 6 remains blocked the time required for the elimination of the added "0" bit.

The decoder 5 is employed for detecting the binary configuration 01111110 which, as seen before, is the configuration of a mark; the decoder 5 furnishes a binary output signal F.

The decoder 15 is employed for detecting the binary configuration 11111111 which is an abnormal case due to an error of transmission of the signal received; this decoder provides a binary output signal G.

The contents of the register 1 are introduced in the register 2 under the control of a receiving control circuit 10, the operation and description of which will given below. The register 2 is controlled for storing throughout the reception of a packet the address code (zone A of FIG. 1) of this packet and thus provides at its outputs the signals $AD_1$ to $AD_8$ respectively corresponding to the eight bits of this code.

The outputs of the register 2 are connected to a PROM, 3, comprising an input decoding circuit. This PROM has a capacity of 256×8 bits and is programmed to furnish at its output the error detecting code corresponding to the address code read in the register 2.

The comparator 4 compares the eight bits present in the register 1 with the eight bits at the output of the PROM 3. The results of the comparison, sampled at the required moment by the control circuit 10, furnishes a signal Q which indicates if the error detecting code relating to the address of a packet does in fact correspond to the address code of this packet and therefore if the address code has not been modified by a transmission error. The same sampling of the output signal of the comparator 4 by the control circuit 10 permits determining if the packet received is for a telephonic transmission or a transmission of data and furnishes for this purpose two signals N and P. The obtainment of these signals N and P and the obtainment of the signal Q will be described hereinafter (FIG. 4).

The holed clock signal h' obtained at the output of the AND gate 6 is applied to the signal input of a modulo 8 counter 11, which is reset to its maximum count by the detection signal F detecting the mark. The three outputs of the counter 11 are connected to the inputs of a decoder circuit 12 which provides at its eight outputs signals $T_0$ to $T_7$ employed in the circuit 10. the signal $T_7$ for example permits determining at what instant an octet is suitably framed in the register 7.

The items of information contained in the register 7 are applied to the inputs of an assembly 13 of nine D-type trigger circuits connected to the receiver bus inside the switching means. The first eight trigger circuits of this assembly are controlled by the circuit 10 to recopy the eight information bits contained in the register 7 at the moment when the items of information are well framed; they furnish the signals $b_1$ to $b_8$. The ninth trigger circuit of the assembly 13 is controlled to be at "0" throughout the duration of a packet except during the last octet of the packet where it is at "1"it furnishes the signal $b_9$ which is employed in the switching means as a packet limiter.

The switching means comprises four receiver FIFO memories 20 to 23 the first of which is adapted to receive the data intended for the station whereas the other three are intended to receive the telephonic items of information intended for the station. These four memories constitute the inputs of means for processing the items of information received; these means are of conventional type and have not been illustrated. The switching means also comprises a transit FIFO memory 24 into which the items of information received and not intended for the station are sent. It is the circuit 10 which controls the switching to any of the FIFO memories 20 to 24 of the items of information contained in the assembly 13 of trigger circuits.

FIG. 4 shows how the circuit of FIG. 3 is constructed.

FIG. 4 shows a PROM 30 having a capacity of 256×3 bits; this memory is programmed in accordance with the state diagram of FIG. 5, which will be referred to hereinafter, to react in accordance with the external conditions relating to the packets received (signals F,G,N,Q,R,Z) and with its preceding state stored in an assembly 31 of three D-type trigger circuits. A decoder 32 decodes these states for the purpose of their use inside the receiver part of the switching means; it furnishes the signals $E_0$ to $E_7$, only the signals $E_0E_1E_2E_5E_6E_7$ of which are used; these signals indicate that the automatic unit constituted by the memory 30 and the trigger circuits 31 is in the corresponding state. These states are the following $E_0$ search of synchronization
$E_1$ search of mark end,
$E_2$ end of a telephone packet,
$E_5$ search of address coherence,
$E_6$ reception of a telephone packet,
$E_7$ reception of a data packet.

The signification of the signals, F, G, N, and Q has already been given: F, detection of the mark configuration in the input stream, G, detection of eight "1"s following each other in the input stream, N, packet of data in the course of reception, Q, coherent address. The signal R="0" indicates the abnormal end of a packet of data by the exceeding of the authorized length or of a telephone packet which has reached its normal length; the signal Z is the resulting signal of the trigger circuits 31 at the moment when feed voltage is applied to the switching means.

In FIG. 4, some binary signals are written with a line above which signifies that it concerns an inverted signal, for example $\overline{E_5}$ signifies: signal inverse of signal $E_5$.

The signals N and P are obtained at the direct and inverse outputs of a D-type trigger circuit 33 which is connected as shown in FIG. 4 and which permits, in accordance with the address code employed and which was described hereinbefore, knowning whether the packet contains telephonic information or data.

To obtain the coherent address signal Q, the output signal of the comparator 4 of FIG. 3 is sampled in a D-type trigger circuit 35 which is connected as shown in FIG. 4.

The control signal of the register 2 (FIG. 3) is furnished by an AND gate 64 which receives the signals $T_7$ and $\bar{E}_5$ at its two inputs.

An eight-stage counter 37 comprising a prepositioning control input to which the signal $E_5$ is applied, has its prepositioning inputs connected, as indicated in the Figure, in such manner that the prepositioning occurs at value 2 in the case of a telephone packet and at value 0 in the case of a packets of data. It counts each octet of the received packet (signal $E_5$ applied to the signal input and clock signal furnished by an OR gate 38 followed by an AND gate 39). The signal R obtained at the output of an AND gate 42 changes to "0" when 33 octets have been received in the case of a packet of date (the maximum size of a packet of data being 32 octets) or when 63 octets have been received in the case of the telephone and the last octet of the packet is awaited. For this purpose, two NAND gates 40 and 41 respectively combine the signal of the output $2^6$ of the counter 37 with the signal P and the signal of the output $2^5$ of the counter 37 with the signal N.

A trigger circuit constituted by two looped NAND gates 43, 44 is placed at "1" at the beginning of the reception of a packet, inasmuch as the coherent condition (signal Q) is satisfied; this trigger circuit furnishes the signal M which is employed (AND gate 49) for providing the clock signal of the trigger circuit assembly 13 of FIG. 3; the ninth input signal of this trigger circuit assembly is formed by the output signal of an OR gate 50 which receives at its inputs the signals $E_0$ and $E_1$ and thus produces a signal indicating the end of the packet.

When the items of information are presented at the receiver bus $B_r$ inside the switching means through the trigger circuit assembly 13 of FIG. 3, a signal K must be produced to authorize the loading of these items of information in one of the FIFO memories 20 to 24 of FIG. 3; this signal K is obtained by means of the circuits 51 to 57 and 65 connected as indicated in FIG. 4 and among which the JK type trigger circuit (also termed masterslave) 53 and 54, reset by the signal Z, serve to eliminate the two address octets at the beginning of the telephone packet which are of no use in the receiving part of the switching means.

A decoder circuit 60 which receives the signals $AD_1$ and $AD_2$ gives an output signal L which is at "1" if the address of the received packet is that of the considered switching means. This signal L is applied to the input with inversion of an AND gate 61 which receives at its other input the signal K authorizing the loading of the memories 20 to 24, the output signal $K_{24}$ of this AND gate authorizes, when it is at "1", the loading in the transit memory 24 of the items of information contained in the trigger circuit assembly 13 (FIG. 3).

The signal L is also applied to one of the inputs of an AND gate 62 which receives the signal K at its other input and whose output signal authorizes the actuation of a decoder circuit 63 which receives at its inputs the signals $AD_3$, $AD_4$ or the address code of the packet received and can thus furnish respectively at four outputs four signals $K_{20}$ to $K_{23}$; these signals authorize the loading in the desired receiver FIFO memory 20 to 23 of the items of information contained in the trigger circuit assembly 13 of FIG. 3.

The receiver bus $B_r$ (FIG. 3) of the switching means is therefore formed by nine information wires corresponding to the signals $b_1$ to $b_g$ of the trigger circuit assembly 13 and five control wires corresponding to the signals $K_{20}$ to $K_{24}$.

Note that in respect of the receiver parts of the switching means according to the invention, the packets received the address code of which is not correct and which are detected by the comparator 4 (FIG. 3) and the trigger circuit 35 (FIG. 4), are transmitted neither to one of the receiver memories 20 to 23 (FIG. 3) nor to the transit memory 24 (FIG. 3) but are consequently destroyed; indeed, as the address is not coherent, the coherent address signal Q is at "0" with the result that the signal M obtained with the NAND gates 43, 44 remains at "0" and the signal M at "0" precludes the sending of the items of information to the receiver bus through the trigger circuit assembly 13 and precludes the loading of the memories 20 to 24 by the blocking of the gates 51 and 57 and the signal K is brought to "0".

FIG. 5 shows the state diagram of the automatic unit comprising the PROM 30 and the trigger circuit assembly 31. In this Figure, the sign v corresponds to the logic OR function and the inverted sign v to the logic AND function; the circles with a reference in the middle correspond respectively to the states $E_0$ $E_1$ $E_2$ $E_5$ $E_6$ $E_7$ previously introduced; the arrows joining two large circles indicates a possibility of passage from one state to the other; the logic equation associated with an arrow (in the vicinity of a small circle intersected by the arrow) represents the condition of this passage. Thus there is a change from state $E_5$ to state $E_0$ if the address is incoherent (Q="1"), otherwise the change is to state $E_7$ if the packet received is a packet of date (N="1"), otherwise the change is to state $E_6$ if it is a telephone packet (P="1").

Figure 6:
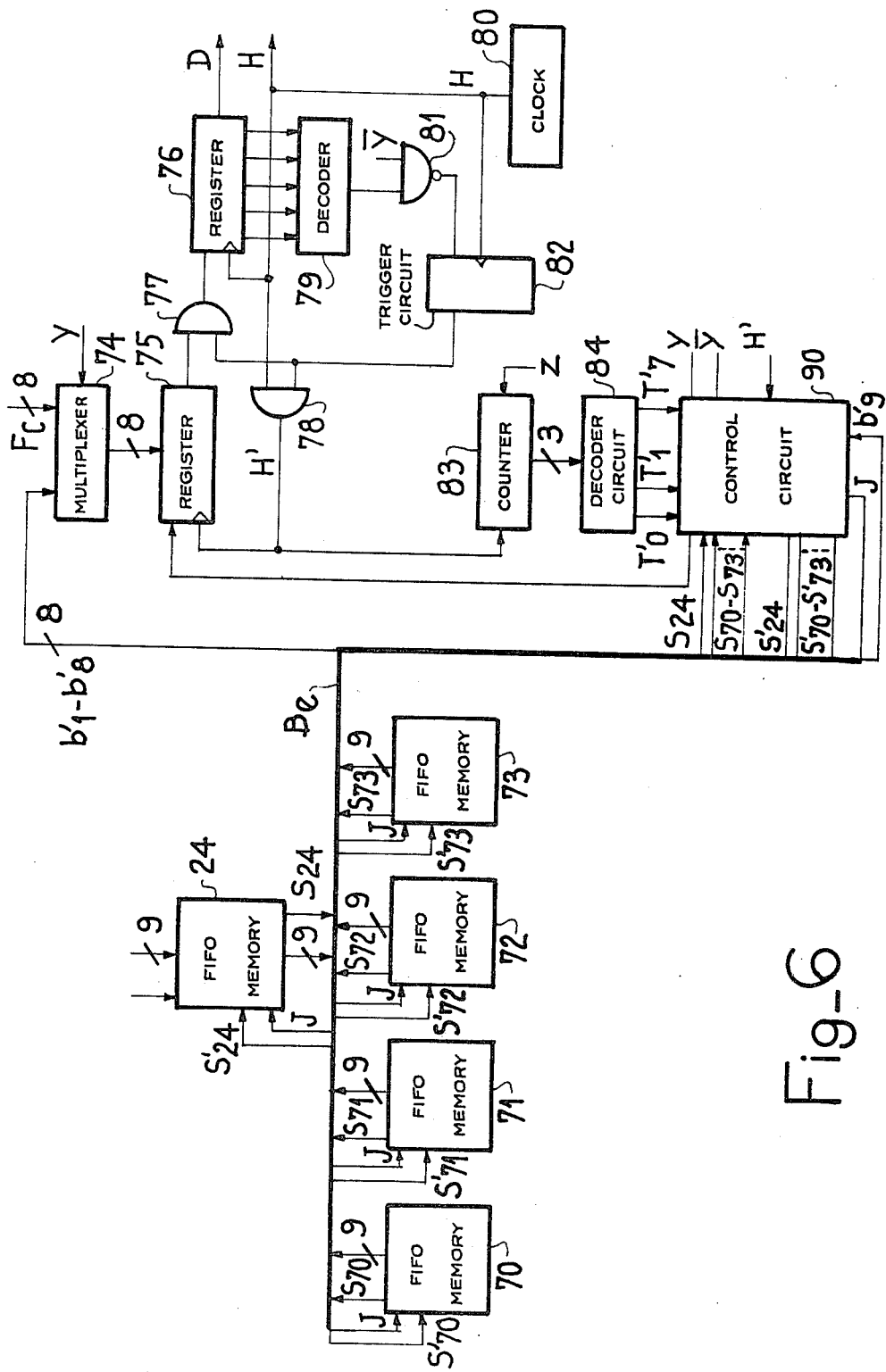
FIG. 6 represents the transmitting part of the switching means whose receiving part is shown in FIG. 3.

FIG. 6 shows the transmitting part of the switching means according to the invention the receiving part of which is shown in FIG. 3.

The packet transmitting part is completely desynchronized with respect to the packet receiving part.

Connected to the transmitter bus $B_e$ of the switching means are:
the transit FIFO memory 24 already shown in FIG. 3, and
four transmitter FIFO memories which are symmetrical with the receiver FIFO memories: data transmitting memory 70 and telephone transmitting memories 71 to 73.

The FIFO memories 24, 70, 71, 72, 73 are memories the outputs of which may be rendered active or inactive by a validation signal. The memories employed in the example are memories 2813 of the American firm A.M.D.: note that the FIFO memories 20 to 23 of FIG. 3 are also memories 2813 of A.M.D. but have their outputs permanently validated.

The transmitter bus comprises nine information wires respectively connected to the nine information outputs of the memories 24 and 70 to 73 and relating respectively to signals $b'_1$ to $b'_9$ which, in the case of the transit memory 24, are the signals $b_1$ to $b_9$ received thereby.

The transmitter bus also comprises wires for transmitting service or control signals:
two of these signals relate to each one of the five memories 29, 70, 71, 72, 73, they are the signals $S_{24}$, $S_{70}$, $S_{72}$, $S_{73}$, which indicate that the corresponding memory is not empty and the signals $S'_{24}$, $S'_{70}$, $S'_{71}$, $S'_{72}$, $S'_{73}$ which are the return signals of the signals S. These signals S' are the validation signals of the memories 24, 70, 71, 72, 73; they authorize the sending of items of information by the designated FIFO memory to the bus $B_e$. The signals S', only a single one of which can at a given instant authorize the sending of information, are furnished by a control circuit 90 which will be described with reference to FIG. 7; the circuit 90 receives the signals $S_{24}$ and $S_{70}$ to $S_{71}$ and the signal $b'_9$, a signal J, common to the five memories 24, 70 to 71, coming from the control circuit 90 and indicating that a group of nine information bits (signals $b_1$ to $b_9$) can be sent by one of the five memories to the bus $B_e$; this signal J is validated or not validated within each of the five memories by the signal S' relating to the memory.

The operation of the transmitting part of the switching means will be explained with reference to FIGS. 6 and 7. The explanation will go as far as the obtainment of the signal D of series data to be transmitted and the clock signal H relating thereto.

A JK-type trigger circuit 93 also termed "master-slave", connected as shown in the Figure, detects the presence of a bit $b'_9$ at "1" (that is to say a signal of the end of a packet) on the transmitter bus. A resistor $R_1$, connected between the +5 volts and the inputs of the trigger circuit 93, furnishes at these inputs a "1" level so that when one of the memories 24, 70, 71, 72, 73 is validated there nonetheless appears a "1" at the inputs of the trigger circuit 93. The latter is reset by the signal Z which was already introduced in the course of the description of FIG. 3.

When the bit $b'_n$ is at "1", the trigger circuit 93 passes to "0"; its inverse output, connected by an AND gate 96 (FIG. 7) to the sampling input of an encoder 91 (FIG. 7), authorizes the sampling of this encoder. The encoder 91 which receives the signals $S_{24}$, $S_{70}$, $S_{71}$, $S_{72}$, $S_{73}$ authorizes, by means of the signals $S'_{24}$, $S'_{70}$, $S'_{72}$, $S'_{73}$ that it produces, the FIFO memory which has the highest priority among those containing a packet, to transmit (signal S at "1") on the bus $B_e$. If no memory has a packet, it has been seen that, owing to the resistor $R_1$, a "1" level was applied to the inputs of the trigger circuit 93 which, by means of a gate 96, permits the permanent sampling of the signals S until one thereof passes to "1". In the case where no signal S passes to "1", no memory is selected and the trigger circuit 93 remains at "0" whereas a trigger circuit 94, of the same type as the trigger circuit 93 and connected as indicated in FIG. 7, remains at "1". The trigger circuit 94, which is reset by the same signal Z as the trigger circuit 93, furnishes at its outputs signals Y and $\overline{Y}$; the signal Y is at "1" during the transmission of the marks and at "0" during the transmission of the text of a packet.

A multiplexer 74 (FIG. 6) permits, in particular, the selection of the mark configuration it receives either from the signals $b'_1$ to $b'_8$ or by a circuit (not shown) which permanently furnishes a group of signals $F_c$ having the mark configuration. The signal Y furnished by the control circuit 90 (trigger circuit 94 of FIG. 7) permits connecting the inputs of the multiplexer 74 for receiving either the signals $b'_1$ to $b'_8$ or the group of signals $F_c$.

The mark configuration is then transferred to a shift register 75 having a capacity of eight bits; this transfer is controlled by the circuit 90 and occurs at the rythm of a holed clock signal H' which will be described hereinafter.

The contents of the register 75 (FIG. 6) are transferred through an AND gate 77 (FIG. 6) to a shift register 76 (FIG. 6) which furnishes the transmitted series data signal D. The register 76 has a capacity of five bits and its clock signal is the signal H of a clock 80 inside the switching means and which furnishes bits at a frequency of 2048 M. bits per second. The transfer from the register 75 to the register 76 depends on the output signal of a D-type trigger circuit 82 the clock signal of which is the signal H and which receives the output signal of a NAND gate 81 which receives the signal $\overline{Y}$ and the output signal of a decoder 79 (FIG. 6); the latter detects the presence of five consecutive "1"s in the signal to be transmitted contained in the register 76. Consequently the transfer from the register 75 to the register 76 is effected for each bit of the clock signal H on condition that the signal $\overline{Y}$ is at "0" (transmission of a mark) or that there are not only "1"s in the register 76. This therefore permits the insertion of the "0"s after five consecutive "1" bits in the text of the packet, that is to say apart from the marks, as has been seen before. In order to ensure that the bit of the register 75 which is ready to be transferred to the register 76 is not lost in the course of the insertion of the "0", the clock signal of the register 75 is furnished by an AND gate 78 which receives at its inputs the signal H and the output signal of the trigger circuit 82, so that the clock input of the register 75 receives no pulse upon the insertion of an "0" in the register 76 and the contents of the register 75 are not modified.

The holed clock signal H' is applied to the input of a modulo 8 counter 83 (FIG. 6) which is reset to its maximum count by the signal Z.

The three outputs of the counter 83 are connected to the inputs of a decoder circuit 84 which furnishes at its eight outputs the signals $T'_0$ to $T'_7$ corresponding to the positioning of the bits in the shift register 75. These signals are employed, at least as concerns $T'_0$, $T'_1$ and $T'_7$, in the control circuit 90 which also receives the holed clock signal H'.

The circuit 90 the diagram of which is given in FIG. 7, permits the control of the transmitting part of the switching means in such manner that, while an octet passes, by successive shifts, from the register 75 to the register 76, the next octet is demanded from the selected FIFO memory. This operation continues until the bit $b'_9$ passes to "1" indicating the end of the packet and thus producing by means of the switching signal Y applied to the multiplexer 74 of FIG. 6, the insertion of at least one mark (by the group of signals $F_c$ applied to the multiplexer 74) between two consecutive packets.

In order to achieve such a control, the circuit 90 illustrated in FIG. 7 comprises, in addition to the multivibrators 93 and 94 just mentioned:

an AND gate 92 which receives the signals $T'_1$, H' and $\overline{Y}$ and furnishes the signal J indicating a new group of nine information bits (signals $b'_1$ to $b'_9$) may be sent from a FIFO memory to the transmitter bus $B_e$, an AND gate 95 which receives the signals $T'_0$ and H' and fursnishes a signal which serves as a clock signal for the trigger circuits 93 and 94 (FIG. 6) and a filling authorization signal for the register 75 (FIG. 6), the AND gate 96 which receives the signals $T'_7$ and H' and the output signal with inversion of the trigger circuit 93 and furnishes a signal controlling the operation of the encoder 91.

Another way of reducing the time of transmission of the packets is to effect the transmission by means of a double loop as shown in FIG. 8. FIG. 8 shows five transmission units $B_1$ to $B_5$ which are part of stations equipped with terminals c; these stations are arranged on a double loop comprising five bidirectional digital transmission channels $V_1$ to $V_5$. Such an arrangement permits reducing the transmission time on average by one half relative to a single loop. By employing in each of the transmission units $B_1$ to $B_5$ two switching means (one for each direction of transmission) of the type described with reference to FIGS. 3 to 7, there is obtained an assembly which greatly facilitates the rapid packet transmission by choosing as the direction of transmission for the sending of a packet from one station to another, the direction giving the minimum travel time. Thus, for the transmission from the transmission unit $B_4$ to the transmission unit $B_2$ the packets will pass through the channels $V_3$ and $V_2$ and not through the channels $V_4$, $V_5$ and $V_1$.

Note that in a system such as that of FIG. 8, the transmission units ($B_1$ to $B_5$) are all identical which is of course an advantage when constructing such an assembly. Moreover, in the event of an incident at a point of the transmission loop, a packet may be sent through a path which avoids the point at which the incident occurred.

For this purpose, certain data packets termed diffusion packets, are diffused in the system for carrying items of information relating to the state of the elements of this system. A switching means which preceives an incident among the parts it controls generates a diffusion packet. This packet comprises a special address code and a code for identifying the switching means which had generated it. Each switching means is passed through by this packet, notes the incident and, if it ascertains that it is the author of the packet, destroys it.

In some constructions it is of utility to have availlable mechanical means for connecting respectively the data and clock inputs (signals d and h, FIG. 3) to the corresponding outputs (signals D and H, FIG. 6). In the event, for example, of the detection of a break in the supply of a switching means, a diffusion packet is generated so long as the reserve of energy permits this (of the order of 10 ms in general), the mechanical means intervenes after. In the case of a diffusion packet indicating the dissappearance of a switching means, the first switching means through which this packet passes replaces the address of the transmitter of the packet by its own address so as to destroy it when this packet comes back to it.

In the case of telephone packets, it is of interest to number modulo n (n for example equal to 256) the transmitted packets corresponding to same communication; the packets containing no useful information (silence between speaking periods) are not transmitted. At the reception, the numbers of packets are employed for regenerating the missing packets.

What we claim, is:

1. A digital communication system between N stations (N greater than 2) in which the stations comprise information producing means, the information being transmitted in the form of packets of variable lengths comprising address bits and in which the communication between at least certain of the N stations are established by means of at least one other of the N stations performing the function of a relay, each of the N stations which may be called upon to perform the function of a relay including a switching means (where n is a positive integer smaller than 3), each of which comprises: checking circuit means for receiving packets produced in the other N stations and for checking the address bits of said received packet according to predetermined criteria; eliminating circuit means coupled to said checking circuit means for eliminating packets selected by said checking circuit means according to said predetermined criteria; and inserting circuit means coupled to said eliminating circuit means and to said information producing means for receiving packets, for subordinating the transmission of packets produced in said information producing means to the presence of a gap between the packets received from said eliminating circuit means and for transmitting integrally a packet received from said information producing means irrespective of the length of said gap, said inserting circuit means including a storing circuit means for storing packets received from said eliminating circuit means.

2. A digital communication system as recited in claim 1, wherein said address bits form an address code relating to the station for which the packet is intended and also form an error detecting code related to said address code, wherein in each of said N stations which may be called upon to perform the function of a relay, each of said n switching means comprises receiving circuit means coupled to said eliminating circuit means for receiving packets, and wherein said checking circuit means comprises comparison circuit means for establishing whether said address code and said error detecting code of a received packet are coherent, wherein said eliminating circuit means eliminates packets having address and error codes that are not coherent and wherein, in each of said N stations which may be called upon to perform the function of a relay, said eliminating circuit means comprises a switching circuit means for coupling said packets in which said address code and said error code are coherent either to said receiving circuit means or to said inserting circuit means in accordance with the address code of said packet being switched.

3. A digital communication system as recited in claim 2, wherein, in each of said n switching means of said N stations which may be called upon to perform the function of a relay, said information producing means are classified according to a rank of priority and wherein said inserting circuit means transmits said received packet from said information producing means in accordance with the priority determined by the rank of said information producing means producing said packet.

4. A digital communication system as recited in claim 1, comprising N bidirectional transmission channels for connecting said N stations in a loop, wherein n is equal to 2 and wherein each of said N stations may be called upon to perform the function of a relay and is connected by two of said bidirectional transmission channels to its two neighbouring stations in the loop, and wherein in each station the two switching means transmit respectively in the two opposite directions of transmission of the loop.

* * * * *